United States Patent [19]
Sodergard et al.

[11] Patent Number: 6,096,855
[45] Date of Patent: Aug. 1, 2000

[54] PROCESS FOR THE PREPARATION OF POLYHYDROXY ACIDS

[75] Inventors: Anders Sodergard; Mikael Stolt, both of Turku, Finland

[73] Assignee: Fortum Oil and Gas OY, Porvoo, Finland

[21] Appl. No.: 09/147,967

[22] PCT Filed: Nov. 7, 1997

[86] PCT No.: PCT/FI97/00675

§ 371 Date: May 27, 1999

§ 102(e) Date: May 27, 1999

[87] PCT Pub. No.: WO98/21263

PCT Pub. Date: May 22, 1998

[30] Foreign Application Priority Data

Nov. 11, 1996 [FI] Finland .................................. 964525

[51] Int. Cl.[7] .................................................. C08G 63/58
[52] U.S. Cl. ........................ 528/354; 528/355; 528/357; 528/361; 528/486
[58] Field of Search .................... 528/354, 355, 528/357, 361, 486

[56] References Cited

U.S. PATENT DOCUMENTS 5,378,801  1/1995  Reichert et al. .

FOREIGN PATENT DOCUMENTS

| 0499747A2 | 8/1992 | European Pat. Off. . |
| 0664309A2 | 7/1995 | European Pat. Off. . |
| 43-002948B4 | 2/1968 | Japan . |
| 04359014A | 12/1992 | Japan . |
| WO 9403522A1 | 2/1994 | WIPO . |
| WO 9407941A1 | 4/1994 | WIPO . |
| WO 9518169A1 | 7/1995 | WIPO . |

OTHER PUBLICATIONS

STN International, File CAPLUS, CAPLUS accession No. 1996:559188, Sun. Jungquan et al.: "Poly(lactic acid) synthesized by acetylacetone complex catalysts", Gongneng Gaofenzi Xuebao (1996), 9(2), 252–256 (abstract).

STN International, File CAPLUS, CAPLUS accession No. 1997:435400, Kricheldorf, Hans r. et al.: "Polylactones. Part 38. Polymerization of L–lactide with Fe(II) lactate and other resorbable FE(II) salts", Macromol. Chem. Phys. (1997), 198(6), 1767–1774 (abstract).

File WPI, Derwent accession No. 93–031687, Asahi Glass Co. Ltd: "Mfr. of lactide polymers used as drug carriers—by ring opening polymerization of hydroxyl cpd. and lactide in presence of composite metal cyanide complex catalyst" (abstract), 1992.

*Primary Examiner*—Duc Truong
*Attorney, Agent, or Firm*—Birch, Stewart, Kolasch & Birch, LLP

[57] ABSTRACT

The invention relates to a process for the polymerization or copolymerization of cyclic lactones of hydroxy acids by using as catalysts organometallic iron compounds containing iron salts or iron esters of carboxylic acids having at maximum 18 carbon atoms or some iron complexes. The invention relates preferably to the polymerization of lactide by using an iron acetate catalyst or initiator.

18 Claims, 1 Drawing Sheet

DEPENDENCE OF MOLAR MASS ON POLYMERIZATION TIME (M/I=2000, T=210 °C).

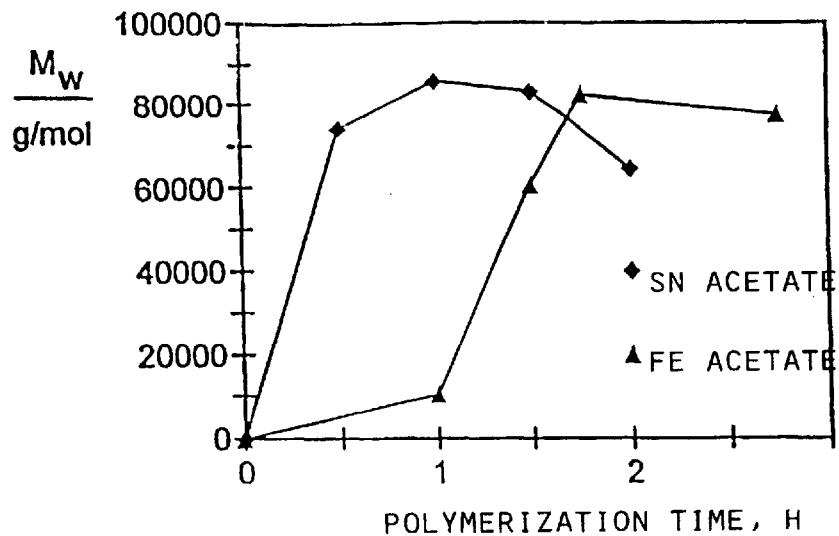
FIGURE 1. DEPENDENCE OF MOLAR MASS ON POLYMERIZATION TIME (M/I=2000, T=210 °C).
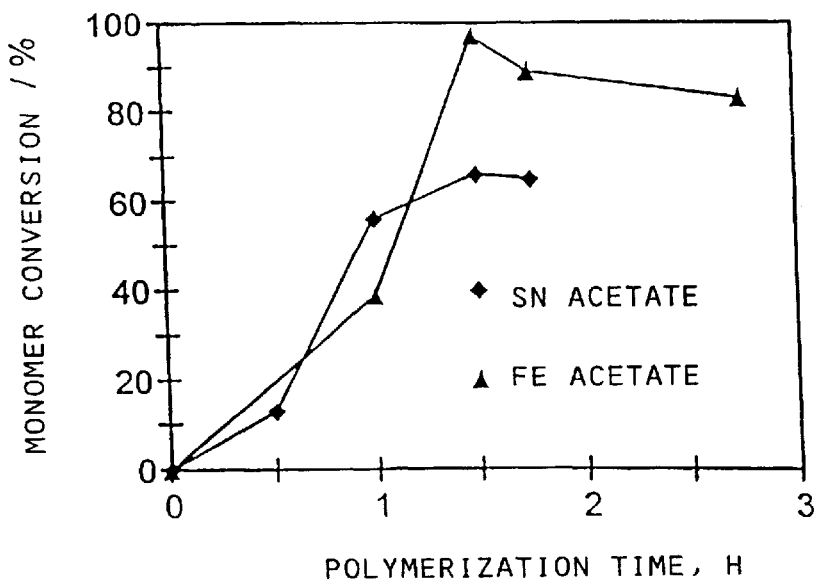
FIGURE 2. MONOMER CONVERSION AS A FUNTION OF TIME (M/I=2000, T=210 °C)

PROCESS FOR THE PREPARATION OF POLYHYDROXY ACIDS

This application is the national phase under 35 U.S.C. §371 of prior PCT International Application No. PCT/FI97/00675 which has an International filing date of Nov. 7, 1997 which designated the United States of America.

FIELD OF THE INVENTION

The present invention relates to the polymerization of hydroxy acids in the molten state by using organometallic iron compounds as the catalyst or initiator.

BACKGROUND OF THE INVENTION

Biodegradable polymers, biopolymers, constitute a group of materials subject to continued development. Their uses include all kinds of applications ranging from packaging products to hygiene products, and also medical applications. Polyhydroxy acids are polymers the monomers of which contain both a carboxylic acid group and a hydroxyl group. Examples of such polymers include polylactic acid (polylactide, PLA) poly(hydroxybutyrate), polyglycolide, and poly($\epsilon$-caprolactone).

Polymers and copolymers of lactic acid have already for years been used for medical purposes, for example in the manufacture of surgical sutures, for degradable bone nails, and for controlled release of drugs. The use of polymers for packaging materials and for other bulk products has so far been limited by the high price of polymers and their susceptibility to degradation during processing. It has not been economically profitable to produce and treat in a manner intended for medical applications a polymer intended for bulk products. Interest in biodegradable polymers, i.e. biopolymers, has greatly increased in recent years, and many companies have made efforts to launch on the market packaging materials, hygiene products, sacks and films for agricultural purposes, and sacks for waste. In particular, various films have gained importance.

Polyhydroxy acids can be produced by polycondensation reactions, which are typical in the production of polyesters, or by ring-opening polymerization from cyclic dimers, lactones. Polyhydroxy acids are thermoplastic polyesters which resemble many conventional polymers.

Polylactides, i.e. condensation polymers based on lactic acid, are for many reasons an especially attractive group of biopolymers. Their principal degradation product, lactic acid, is a product common in nature, it is not toxic and is used widely in the food and pharmaceutical industries. A high molecular weight polymer can best be produced by ring-opening polymerization from lactide. Lactic acid is optically active, and thus its dimer appears in four different forms: L,L-lactide; D,D-lactide; L,D-lactide (mesolactide); and a racemic mixture of L,L- and D,D-lactides. By polymerizing these either as pure compounds or at different blend proportions, polymers are obtained which have different stereochemical structures affecting their resilience and crystallinity and, consequently, also their mechanical and thermal properties. The obtained polymers are usually hard and optically clear.

The ring-opening polymerization of cyclic lactones of hydroxy acids, such as lactide, glycols, $\epsilon$-caprolactone, etc., constitutes technology known per se. The polymerization processes known are various, some examples being patent U.S. Pat. No. 5,378,801 relating to extrusion polymerization, patent publication EP0664309-A relating to two-step polymerization, and patent publication EP0499747-A describing polymerization in a mixing reactor. The feature common to these publications, as well as to most others, is that the catalyst is a tin compound, preferably tin octoate. Other catalysts have also been experimented with, but tin compounds have proven to be the best.

However, if the intention is to use the polymer in contact with food, for example, as a packaging material, and also for reasons of environmental protection, the use of tin compounds is not desirable.

It has now been observed, surprisingly, that by using certain types of iron compounds as catalysts (initiators) it is possible to produce polymers having competitive properties.

It was previously known to use an oxide complex of iron and propylene (JP68002948) or cyanide complexes of iron or other metals (JP04359014) as a catalyst in the polymerization of glycolides and lactides. In patent publication WO94/03522, iron compounds are used for the catalysis of the condensation polymerization of lactic acid. However, it was not possible to polymerize lactide, the other product of the condensation polymerization, with iron compounds, but a conventional tin catalyst was used. The molar mass of the polylactic acid was relatively low and the yield was low.

BRIEF DESCRIPTION OF THE DRAWINGS

FIG. 1 is a graph of the molar mass as a function of polymerization time for both tin acetate and iron acetate.

FIG. 2 is a graph of the monomer conversion as a function of polymerization time.

DETAILED DESCRIPTION OF THE INVENTION

The catalysts used according to the present invention are iron salts of carboxylic acids and are prepared using organic compounds having at maximum 18 carbon atoms. Examples of such carboxylic acids include formic, acetic, propionic, butyric, valeric, caproic, caprylic, pelargonic, capric, lauric, myristinic, palmitic, stearic, acrylic, cinnamic, and benzoic acids. Preferably the number of carbon atoms is at maximum 10. Especially good results have been achieved with iron(II) acetate. A suitable ratio of the amount of monomer to the amount of catalyst is approximately 100–10000. Depending on the monomer, the polymerization temperature is approximately 80–240° C., for example 160–240° C. with lactide and 80–200° C. with $\epsilon$-caprolactone. Also some iron complexes, like ferric acetylacetonate, have been successfully used at above conditions.

A polymer or copolymer according to the invention can be prepared from the ring-like lactone of any hydroxy acid, such as L-lactide, D-lactide or D,L-lactide, or mixtures thereof glycol, $\epsilon$-caprolactone, or other corresponding cyclic compounds, by any polymerization process, batch, semi continuous or continuous. Continuous polymerization can be carried out advantageously by polymerization during extrusion. The polymer is produced by heating the monomer or the monomer blend to produce a homogeneous melt and by adding a catalyst in order to polymerize the lactide, whereupon the ring opens. The polymerization is preferably performed in inert conditions, for example, in a nitrogen atmosphere or under a vacuum. The molar mass ($M_w$) of the polymer is approximately 20000–500000, preferably 40000–300000. Preferably the polymer is prepared from L-lactide.

The polymer, such as polylactide, is upon formation in equilibrium with its monomer, such as lactide. This has sometimes also been viewed as being advantageous, since monomers and oligomers may serve as polymer plasticizers, but it also leads to rapid hydrolysis and causes problems of adhesion in the processing of the polymer. Furthermore, the presence of monomer lowers thermal stability during melt processing. Usually the residual monomer must be removed from the polymer. An acceptable monomer concentration is below 2%, preferably below 1%. Various removing methods, such as evaporation, have been disclosed.

The breaking down of the polymers during processing can be reduced by removing the residual monomer, by maintaining the water content low (below 200 ppm) or by adding commercial stabilizers (WO 94/07941). In terms of processing, such as film blowing, an advantageous method is to mix certain peroxides with the polymer, whereby the melt strength of the polymer is rendered sufficient for melt processing (FI945964, FI945264).

Polymers prepared by the process according to the invention can effectively be tailored according to the intended use by the selection of a suitable plasticizer and, when necessary, a filler. Suitable plasticizers include many commonly available commercial plasticizers, such as mono- and polycarboxylic acid esters, polymeric polyesters, polyalkyl ethers, as well as glycerol esters and glycol esters. Blends of various plasticizers may also be used. Suitable plasticizer amounts, for example, for film blowing grades are 10–30% by weight preferably 15–20% by weight.

The fillers used may be any conventional inorganic or organic fillers, such as calcium carbonate, kaolin, mica, talc, silica and zeolite. A suitable amount of filler may be 0.1–10% by weight, depending on the product. The purpose of the use of filler is to inhibit adhesion and thereby to facilitate, for example, the splitting of a tubular film.

When necessary, other conventional additives, such as pigments, can be used. For example, shopping bags are most commonly white, and in such a case titanium dioxide can be used for producing a white film.

The plasticizers and, when so desired, fillers and other additives are mixed with the polymer, before processing, by a conventional melt-mixing method, for example in a double- or single-screw extruder, or in a batch mixer.

The stabled polymer material may be used for manufacturing films by the blowing method, or it is, of course, also possible to use the polymer for manufacturing flat films or sheets, which does not usually set such high demands on the polymer. The uses of the films include conventional uses of films, in particular those in which the aim is minimization of waste and the treatment of waste by composting, for example. This includes various packaging materials, such as bags, films, shopping bags and hygiene products such as diapers, and various agricultural films.

Sheets made from the polymer can also be used as various packaging trays or covers and, for example, in agricultural use as cultivation trays or pots.

The invention is described in greater detail with the help of the following examples.

L-lactide (manufacturer Purac) was crystallized out from ethyl acetate. The iron compounds were used as such, without separate purification, and were dissolved in suitable solvents or, if they were not soluble, they were added in the form of powder to the monomer.

The iron compound and L-lactide were placed in 6 ml glass ampoules, which were sealed.

The experiments were performed in a nitrogen atmosphere. The ratio of monomer to initiator was 100–10000, and the polymerization temperature was 170–210° C. The ampoules were kept in an oven at the polymerization temperature, and the polymerization was discontinued at the desired time by removing the ampoules from the oven.

An SEC (Size Exclusion Chromatography) apparatus was used for the molar mass measurements. The monomer conversion was determined by the NMR technique. DSC (Differential Scanning Calorimetry) measurements were made using a Perkin Elmer apparatus.

EXAMPLE 1

L-lactide polymerization runs were performed by using various iron oxides as initiators. The polymerization temperature was 210° C. in all of the experiments. The compounds used were: iron, iron(II) oxide, iron(II,III) oxide, iron(III) oxide, and hydrogenated iron(III) oxide.

Iron oxides proved to be very poor initiators. Only with hydrogenated iron(III) oxide was some kind of polymer produced. When the polymerization time was more than 22 hours, a molar mass of approximately 26000 g/mol was obtained.

EXAMPLE 2

Iron acetate proved to be a very good initiator for lactide. Viscosity began to increase after approximately one hour, and polymerization continued until a solid product formed. The polymerization was affected by both the temperature used and the monomer/initiator (M/I) ratio. The optimal M/I molar ratio was approximately 1000. The results are shown in Table 1.

TABLE 1

Effect of Monomer/initiator ratio on molar mass.
Polymerization time 1 hour.

| M/I ratio | Molar mass (210° C.) | Molar mass (190° C.) |
|---|---|---|
| 500 | 10000 | 56000 |
| 750 | 78000 | 58000 |
| 1000 | 85000 | 66000 |
| 2500 | 43000 | 26000 |
| 10000 | 8000 | 20000 |

The effect of the polymerization temperature on the molar mass is shown in the results, which are compiled in Table 2.

TABLE 2

Effect of polymerization time on molar mass. M/I ratio 1000.

| Time (h) | Molar mass (170° C.) | Molar mass (190° C.) | Molar mass (210° C.) |
|---|---|---|---|
| 0.5 | | 30000 | 50000 |
| 1.0 | 10000 | 50000 | 85000 |
| 2.0 | | 66000 | 100000 |
| 4.0 | 13000 | 60000 | 130000 |
| 19 | | | 350000 |
| 22 | 40000 | | |

The temperature affected the molar mass and also the degree of polymerization. At 210° C. increased throughout the time, but at 190° C. the reaction time did not affect after 1.5 hours. A temperature of 170° C. seemed too low for polymerization. An especially high molar mass ($M_w$= 350000) was obtained at a temperature of 210° C., in a time of 19 h.

When iron acetate is used, the molar mass distribution is wide.

EXAMPLE 3

The efficacy of iron acetate was compared with that of tin acetate, which is regarded as a highly effective catalyst for lactide polymerization. The polymerization was performed by the same procedure as in Example 2. FIG. 1 shows the molar mass es a function of polymerization time both when tin acetate and when iron acetate is used. The molar mass increases rapidly when tin acetate is used, but a molar mass of the same level is obtained within a moderate polymerization time also when iron acetate is used. FIG. 2 shows the monomer conversions as a function of polymerization time. A nearly complete monomer conversion is achieved with iron acetate.

EXAMPLE 4

Experiments were performed by using other iron compounds as catalysts:

With iron(III) citrate, no polymerization was achieved even after 20 hours of polymerization. The monomer/catalyst ratio was 1000.

The use of the iron(II) salt of D-gluconic acid was experimented with by using different monomer/catalyst ratios and different polymerization times, the polymerization temperature being 210° C. The results are shown in Table 3.

TABLE 3

Use of iron (II) salt of D-gluconic acid as catalyst.

| M/I ratio | Polymerization time, h | Outer appearance | Molar mass | Monomer conversion |
| --- | --- | --- | --- | --- |
| 100 | 3 | black, solid | — | — |
| 100 | 10 | black, solid | — | — |
| 1000 | 1 | brown, solid | — | — |
| 1000 | 3 | light polymer | 20000 | — |
| 1000 | 10 | brown polymer | 25000 | 76% |
| 1000 | 20 | brown polymer | 15000 | 96% |
| 5000 | 4 | light brown polymer | 21000 | — |
| 5000 | 24 | light brown polymer | 18000 | — |

One equivalent part of iron(II) oxide was allowed to react with 2-ethylhexanic acid, and the filtered and evaporated compound was used as the catalyst. The catalyst worked well, but it was required in a large amount. The proportion of metal in the catalyst was rather small. The results are shown in Table 4.

TABLE 4

The use of iron complex as catalyst. Polymerization temperature 190° C.

| Catalyst amount, wt. % | Polymerization time, h | Outer appearance of product |
| --- | --- | --- |
| 0.09 | 3 | unreacted monomer |
| 0.11 | 24 | brown, solid |
| 0.16 | 6 | light, polymer of low molar mass |
| 0.97 | 1.5 | white polymer (molar mass 60000) |

EXAMPLE 5

Iron (II) oxide and acetic acid were allowed to react with each other at a temperature of 115° C. The iron compound and ε-caprolactone were placed in 6 ml glass ampoules, which were sealed in a nitrogen atmosphere. The monomer/catalyst ratio was 1000, and the polymerization temperature was 100–200° C. The ampoules were kept at the desired temperature, and the polymerization runs were discontinued at the desired time by withdrawing the ampoules from the oven. The polymerization results are shown in Table 5.

TABLE 5a

Effect of polymerization temperature and time on molar mass.

| Polymerization time, h | Molar mass (100° C.) | Conv. (%) |
| --- | --- | --- |
| 18 | — | 2.3 |
| 68 | 8300 | 41.5 |
| 96 | 10200 | 30.6 |
| 113/1 | 11900 | 24.7 |
| 113/2 | 13900 | 41.7 |

TABLE 5b

Effect of polymerization temperature and time on molar mass.

| Polymerization time, h | Molar mass (150° C.) | Conv. (%) |
| --- | --- | --- |
| 4 | 12400 | 44.2 |
| 8 | 51100 | 80.5 |
| 21 | 34600 | 91.0 |
| 27 | 35200 | — |
| 32 | 40800 | 97.0 |

TABLE 5c

Effect of polymerization temperature and time on molar mass.

| Polymerization time, h | Molar mass (200° C.) | Conv. (%) |
| --- | --- | --- |
| 2 | 23800 | 42.3 |
| 4 | 28600 | 79.1 |
| 8 | 22400 | 94.4 |
| 21 | 17000 | 95.8 |
| 32 | 15400 | — |

EXAMPLE 6

As an example of iron complexes, ferric acetylacetonate has been used as catalyst. Ferric acetylacetonate and lactide were placed in 5 ml glass ampoules, which were sealed in a nitrogen atmosphere. The monomer/catalyst ratio was 1000, and the polymerization temperature was 210° C. The ampoules were kept at the desired temperature, and the polymerization runs were discontinued at the desired time by withdrawing the ampoules from the oven. The polymerization results are shown in Table 6.

TABLE 6

The effect of polymerization time on molar mass using ferric acetylacetonate as catalyst.

| Polymerization time, h | Molar mass (210° C.) | Conv. (%) |
| --- | --- | --- |
| 0.25 | 65800 | 19.5 |
| 0.5 | 50500 | 67.7 |
| 0.75 | 41200 | 88.7 |
| 1 | 29300 | 91.6 |
| 1.5 | 30200 | 56.3 |
| 2 | 30700 | 88.3 |
| 3 | 27200 | 94.8 |
| 4 | 18600 | 84.6 |

What is claimed is:

1. A process for the polymerization or copolymerization of cyclic lactones of hydroxy acids wherein compounds containing iron salts of iron and organic carboxylic acids having at maximum 18 carbon atoms are used as the catalyst or initiator.

2. A process according to claim 1, wherein carboxylic acids having at maximum 10 carbon atoms are used for the preparation of the compounds.

3. A process according to claim 1 or 2, wherein the monomer is lactide.

4. A process according to claim 1 or 2, wherein the monomer is ε-caprolactone.

5. A process according to claim 1, wherein the catalyst is iron(II) acetate.

6. A process according to claim 1, wherein the monomer/catalyst ratio is 100–10000.

7. A process according to claim 1, wherein the polymerization temperature is 80–240° C.

8. A process according to claim 3, wherein the polymerization temperature is 160–240° C.

9. A process according to claim 4, wherein the polymerization temperature is 80–200° C.

10. A process according to claim 1, wherein the iron compound is used together with another catalyst.

11. Products manufactured from a polymer produced by the process according to claim 1.

12. The process for the polymerization or copolymerization of cyclic lactones of hydroxy acids according to claim 1, wherein the cyclic lactones of hydroxy acids are selected from the group consisting of L-lactide, D-lactide, D,L-lactide, glycol, ε-caprolactone and mixtures thereof.

13. The process for the polymerization or copolymerization of cyclic lactones of hydroxy acids according to claim 1, wherein the carboxylic acid of the catalyst is selected from the group consisting of formic, acetic, propionic, butyric, valeric, caproic, caprylic, pelargonic, capric, lauric, myristinic, palmitic, stearic, acrylic, cinnamic, and benzoic acids.

14. The process for the polymerization or copolymerization of cyclic lactones of hydroxy acids according to claim 1, wherein a monomer or monomer blend of lactones of hydroxy acids are heated to produce a homogeneous melt and adding the catalyst whereupon the ring opens and polymerization occurs.

15. The process for the polymerization or copolymerization of cyclic lactones of hydroxy acids according to claim 14, wherein the molar mass ($M_w$) of the polymer is approximately 20000–500000.

16. The process for the polymerization or copolymerization of cyclic lactones of hydroxy acids according to claim 1, wherein the cyclic lactones of hydroxy acids is L-lactide.

17. The process for the polymerization or copolymerization of cyclic lactones of hydroxy acids according to claim 14, wherein the residual monomer is removed from the polymer.

18. The process for the polymerization or copolymerization of cyclic lactones of hydroxy acids according to claim 1, wherein the polymerization temperature is 170–210° C.

* * * * *